April 13, 1965 C. W. WILKINSON 3,178,679
ELECTRONIC RADIATION SYSTEMS
Filed March 1, 1962 3 Sheets-Sheet 3

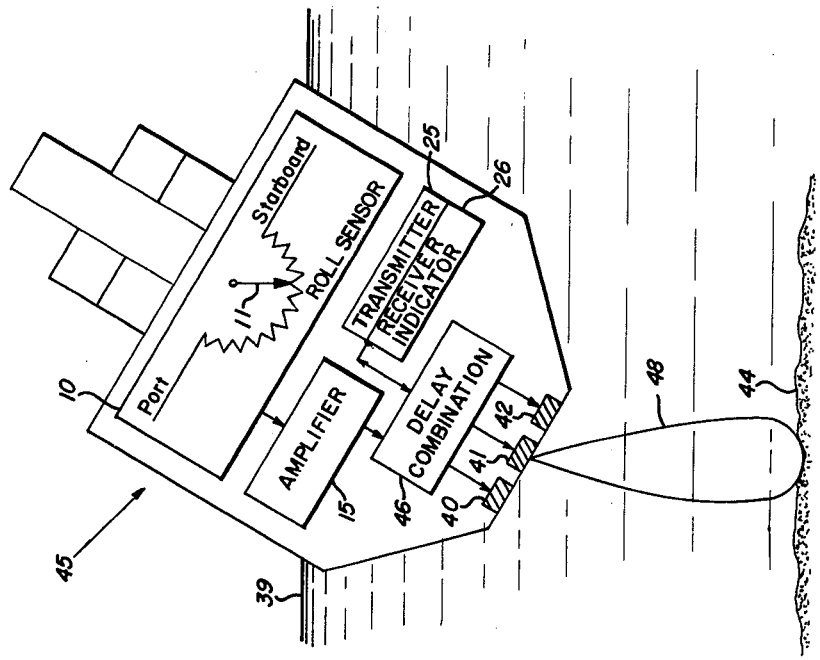
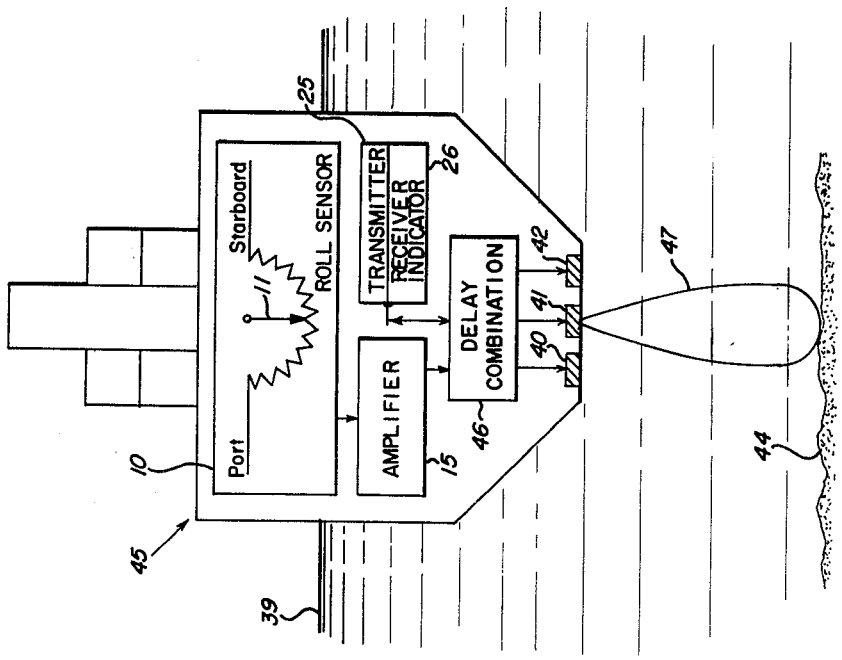

INVENTOR
CHARLES W. WILKINSON
BY Herbert W. Arnold
ATTORNEY

United States Patent Office 3,178,679
Patented Apr. 13, 1965

3,178,679
ELECTRONIC RADIATION SYSTEMS
Charles W. Wilkinson, Cochituate, Mass., assignor to Raytheon Company, Lexington, Mass., a corporation of Delaware
Filed Mar. 1, 1962, Ser. No. 176,578
10 Claims. (Cl. 340—3)

The present invention relates to radiation patterns, and, more particularly, to a system which provides electronic beam steering by altering the phase delay of signals transmitted by two or more transducer elements.

In the field of making depth soundings, it is highly desirable that there be vertical stabilization of the acoustic axis regardless of the motion of a vehicle, such as a ship, in order to reduce the number of soundings normally lost due to ship roll and pitch. Furthermore, in the area of communications and radar, it is highly desirable that antenna patterns provide maximum power gain and beam definition continuously in a particular direction with relation to the device containing the radiators.

Therefore, it is an object of the present invention to provide a new and improved system for electronically varying the direction of radiation patterns.

It is an additional object of the invention to provide a system which will insure vertical stabilization of the acoustic axis regardless of the degree of the roll and pitch of the ship.

It is a further object of the invention to provide a narrow stabilized bandwidth in all planes so as to provide increased transmitted power gain, beam definition, power, and at the same time increase the signal-to-noise ratio in the receiver by an equivalent amount.

It is an additional object of the invention to provide a system which is capable of a high degree of resolution for hydrographic exploration of the ocean floors at great depths.

It is a further object of the invention to provide a system which is capable of sweeping a beam pattern so as to be able to chart the ocean floor.

It is an additional object of the invention to provide a system which utilizes a controlled delay in order to attain both maximum power gain and beam definition in a particular direction.

In accordance with this invention, a system for providing electronic beam steering by altering the phase delay of signals transmitted by a plurality of transducers comprises a roll sensor for purposes of explanation, although it is conceivable that the stabilized gyro on a vehicle could be designed so as to supply the same signal as the roll sensor. The roll sensor provides an output signal which varies in accordance with the roll of the vehicle. This signal is applied to delay lines so as to change the delay of a second signal to be propagated by the transducers. In this manner the beam is electrically moved by means of a signal applied to a delay line which is connected to the transducer beam forming elements.

In addition, other applications requiring the capability of beam sweeping utilize a control means to vary the delay of the delay line so as to sweep the beam away from the vertical.

For a better understanding of the present invention, together with other and further objects thereof, reference is had to the following description taken in connection with the accompanying drawings and its scope will be pointed out in the appended claims. Other objects and advantages will become apparent from the following description, taken in connection with the accompanying drawings, wherein:

FIG. 2 represents the radiation transducer pattern in the absence of roll;

FIG. 3 is a diagram which represents the radiated transducer pattern in the presence of a roll condition;

Figure 1:
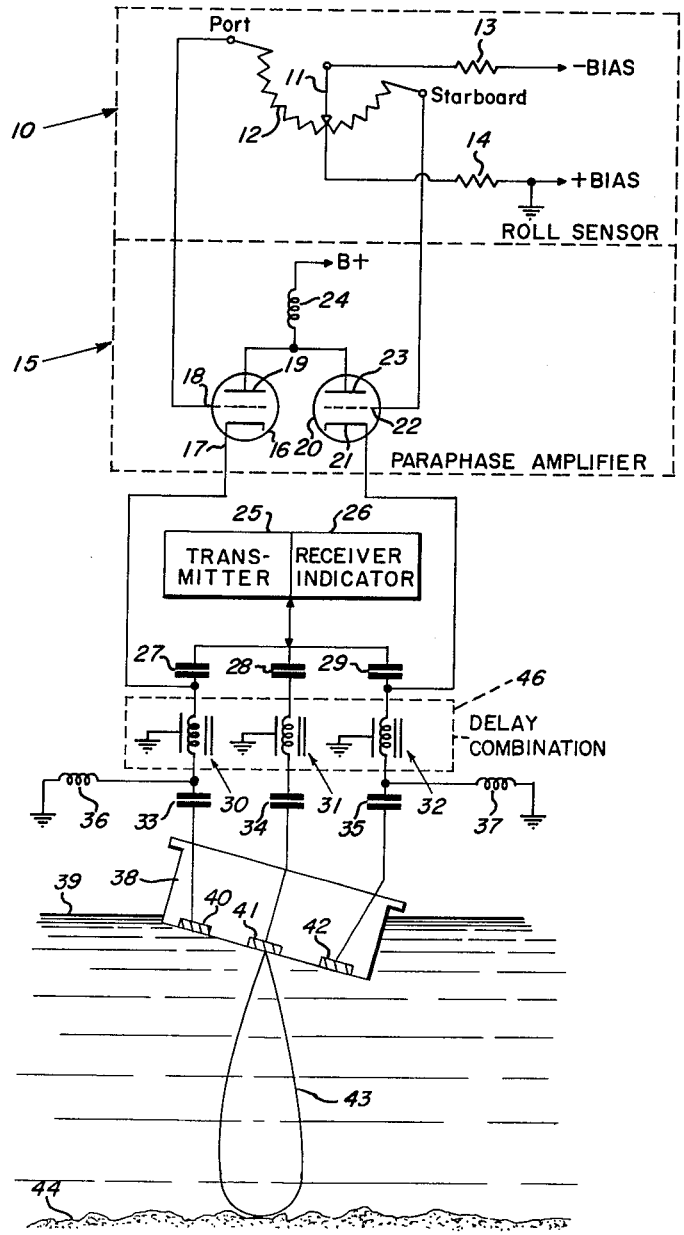
FIG. 1 illustrates a general arrangement of a system suitable for electrical beam stabilization required to compensate for the roll of the ship.

Referring particularly to FIG. 1, there is shown a roll sensor 10, which consists of a pendulous sensing element 11 oriented and weighted to true vertical, a circular resistive element 12 in a thwartship plane which swings relative to the roll of the ship, and resistors 13 and 14 connected to opposite ends of the pendulous sensing element 11 and to a bias source for a paraphrase amplifier 15. This amplifier consists of tubes 16 and 20 having grids 18 and 22, cathodes 17 and 21, and plates 19 and 23, respectively. Included in close proximity, there is a transmitter 25 for supplying the signal to be radiated, and a receiver indicator 26 for detecting the reflected radiated signal. A device suitable for the above application is shown in United States Letters Patent No. 2,750,574, issued June 12, 1956 to Robert A. Fryklund.

Connected to the paraphase amplifier 15 is a delay combination 46 comprising electrically variable delay lines 30 and 32, and fixed delay line 31 for delaying their respective part of the transmitted signal. Delay lines 30 and 32 are of the type that change the value of their respective delays in response to the amount of direct current flowing through them. Connected to the delay lines are transducers, such as crystal or ceramic transducers, 40, 41, and 42 located in the ship's hull 38 for radiating the signal from transmitter 25. There is also an inductive load 24 in the D.-C. path of paraphase amplifier 15, and capacitors 27, 28, 29, 33, 34 and 35 are connected in the A.-C. path of the transmitted signal. Inductors 36 and 37 provide a D.-C. bypass to ground from paraphase amplifier 15. In addition, there is shown a radiated pattern 43 showing the vertical beam attained by the invention.

FIG. 2 represents the radiation pattern of the system shown in FIG. 1 in the absence of roll. There is a representation of the roll sensor 10, and the positions of the resistive element 12 with respect to element 11 of said roll sensor. The general arrangement of amplifier 15, transmitter 25, receiver indicator 26, and delay combination 46 is also shown in conjunction with the stern view of a ship 45 which shows the positions of transducers 40, 41 and 42 in relation to each other and the radiated signal pattern 47. FIG. 3 shows the radiated pattern in the presence of a roll condition. Elements 11 and 12 are now depicted in their respective position in the presence of a roll condition. The stern view of the ship 45 shows the relative positions of transducers 40, 41 and 42 with respect to the radiated beam signal pattern 48.

Considering now the operation of the system described above, and referring to FIGS. 1, 2 and 3, the roll sensor 10 provides equal bias potentials in the no-roll condition, so as to provide for a balanced paraphase amplifier 15. Inasmuch as the grids 18 and 22 of paraphase amplifier 15 are at equal bias potentials, equal direct currents will flow in delay lines 30 and 32. The amount of delay in delay line 31 is chosen to be equal to that in the delay lines 30 and 32 under the conditions of this direct current balance in paraphase amplifier 15. The three transducer elements 40, 41 and 42 are thus driven in equal phase delay in the no-roll condition, thereby producing a plane-wave parallel to the transducer's active surface and perpendicular to the vertical direction of propagation of the signal supplied by transmitter 25.

As the ship 38 rolls to starboard, the grid 22 of tube 20 becomes more negative due to the rotation of roll sensor 10, and at the same time the grid 18 of tube 16 becomes more positive due to the effect of the roll of ship 38 on roll sensor 10. As the conduction of tube 20 decreases, the amount of signal delay in the starboard delay line 32 will increase in proportion to the change in the D.-C. current flowing through delay line 32. Similarly, as the conduction of tube 16 increases due to grid 18 becoming more positive, the amount of delay in the port delay line will decrease by an equal amount due to the increase in current flowing through tube 16 and delay line 30. Under this condition, the output phase of the port element 40 leads the output phase of the center transducer 41 which, in turn, leads the output phase of the starboard transducer 42, and a plane wave is formed at an angle to the transducers' surfaces. This angle is equivalent to the angle of the ship's roll, and in a direction required to compensate for ship's roll. The plane wave 43, therefore, remains parallel to the horizontal plane and direction of propagation remains vertical. In this manner, the maximum response axis of transducers 40, 41 and 42 can be electronically steered in such a manner that the radiated output becomes stabilized in the vertical axis.

Figure 4:
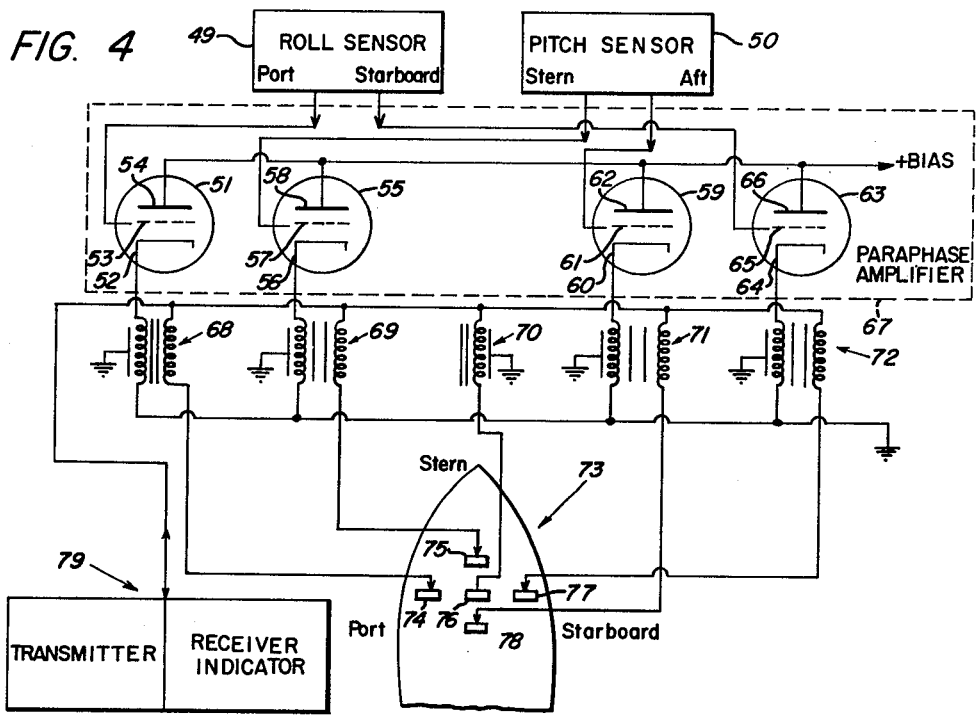
FIG. 4 illustrates the general arrangement of a system suitable for electrical beam stabilization to compensate both for the roll and pitch of a ship.

FIG. 4 illustrates the general arrangement of a system suitable for electrical beam stabilization to compensate both for the roll and pitch of a ship. There are shown roll sensors 49 and 50 for supplying the required roll and pitch information. There is also shown a paraphase amplifier 67 consisting of tubes 51, 55, 59 and 63 for amplifying the signals supplied to both the roll and pitch sensors. There is also provided a transmitter-receiver indicator 79 for providing the energy to be radiated. In addition, there is provided variable delay lines 68, 69, 70, 71 and 72 for delaying the energy provided by transmitter-receiver indicator 79 in relation to the signal supplied by both the roll and pitch sensors 49 and 50, respectively. There is also shown a ship's bottom view 73, depicting the relative positions of transducers 74, 75, 76, 77 and 78, said transducers being required to transmit the energy supplied by transmitter-receiver indicator 79 and delayed by variable delay lines 68, 69, 70, 71 and 72, respectively.

Considering now the operation of the system illustrated in FIG. 4, the roll sensor 49 and pitch sensor 50 provides a signal representing the change of bias caused by either the roll or pitch of the ship 73. The signals produced by the sensors 49 and 50 are similarly fed as described above in relation to the simple roll device of FIGS. 1, 2 and 3. Similarly, the delay lines 68, 69, 70, 71 and 72 react, in like manner, as the delay lines described in the roll device of FIGS. 1, 2 and 3. In addition, the transducers 74, 75, 76, 77 and 78 operate similarly to the transducers described in FIGS. 1, 2 and 3. Therefore, it is possible in like manner to control both roll and pitch at the same time so as to provide a means for electronically shifting the radiation pattern so as to stabilize the beam in the vertical axis.

Figure 5:
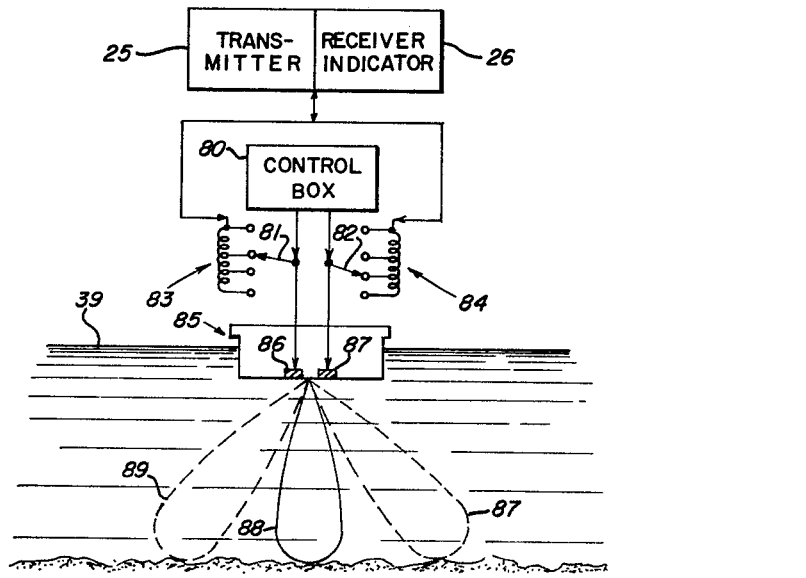
FIG. 5 illustrates a further arrangement of a system suitable for electrical beam steering.

FIG. 5 illustrates a further arrangement of a system suitable for electrical beam steering. There is shown transmitter 25 and receiver indicator 26 for radiating a signal and detecting the reflected radiated signal. Acting in concert with transmitter 25 are tapped delay lines 83 and 84, and control box 80 for controlling the amount each tapped delay line is to be utilized. Also shown is a ship's hull 85, containing transducers 86 and 87. In addition, there is illustrated radiation patterns 88, 89 and 90, representing the sweep of the ocean floor caused by delay changes in delay lines 83 and 84.

In operation, control box 80 provides a plurality of signals for actuating arms 81 and 82 of tapped delay lines 83 and 84. In the presence of control signals from control box 80, arms 81 and 82 are shifted in relation to the delay required in each of the multiple output signal paths represented by transmitter 25, delay lines 83 and 84, and transducers 86 and 87, in order to sweep the output beam across the ocean floor 44. Therefore, there is provided a means, similar to the systems of FIGS. 1 to 4, for providing a variable delay to steer the output, so as to attain radiation patterns 88, 89 and 90.

Other possible embodiments of the invention might include numerous combinations of communication or radar antennas on atmospheric vehicles, space vehicles, surface craft, and bottom Doppler ship systems. Although the preferred embodiment shown is utilized primarily in the acoustical frequency ranges, it is possible by making minor modifications to use the entire range of available frequencies and still accomplish the invention. In addition, the systems illustrated in FIGS. 1 to 4 showing the variable delay lines could be modified within the intent of the disclosed invention to include variable delay capacitors responsive to variations in voltage. Furthermore, the embodiment of the invention shown in FIG. 5 can utilize a variable current control so as to supply the variations in delay to sweep the beam radiation pattern.

What is claimed is:
1. In combination:
a vehicle means;
roll and pitch sensor means coacting with said vehicle means;
an electronic amplifier means;
means for applying the output of said roll and pitch sensor means to said electronic amplifier means;
a transmitter means;
a plurality of electronically variable delay means;
means for applying the signal output of said transmitting means to said plurality of delay means;
a plurality of radiating means for producing a radiated signal;
means for applying the signal output of said plurality of delay means to said plurality of radiating means;
and means to vary the delay in each of said plurality of delay lines in response to said roll and pitch sensor means output comprising connecting means for applying the output of said amplifier means to said plurality of delay means.

2. A combination as claimed in claim 1, including means for detecting a reflected portion of said radiated signal comprising receiving and indicating means.

3. A combination as claimed in claim 1 wherein said plurality of electronically variable delay means comprises variable current-responsive inductor delay means.

4. In a system for installation on a ship:
means for providing a first electrical signal;
a plurality of means for electronically delaying said first signal;
a plurality of means for radiating said delayed first signal;
electronic amplifier means;
means for providing a second electrical signal representative of the roll of said ship to said amplifier means;
and means for providing for a radiated signal plane wave in a particular direction in response to said second signal comprising a plurality of means connecting said amplifier means to said electronic delaying means.

5. A system comprising:
a vehicle means;
roll and pitch sensor means coacting with said vehicle means;
a signal producing means;
a plurality of electronically variable delay means;
means for applying the output of said signal means to each of said variable delay means;
a plurality of radiating means;
means for providing the output of each of said plurality of variable delay means to each of said plurality of radiating means;
and means to provide a plane wave steered radiated signal in response to vehicle pitch and roll information comprising amplifier means connected to both said plurality of variable delay and said sensor means.

6. In a depth sounding system for installation in a ship;
a signal generator;
a fixed delay;
two variable delays;
said variable delays increasing their magnitude of delay with a decrease in current flow through said delays;
means for applying a portion of the output from said signal generator to said fixed delay;
means for applying a portion of the remainder of the output from said signal generator to each of said variable delays;
a ship's roll sensor;
an electronic amplifier;
means for coupling said amplifier to said sensor;
said amplifier operating on an output signal from said sensor to provide a pair of current signals which change in a reverse sense from each other in accordance with the magnitude of an output signal from said sensor;
a plurality of sonic transducer elements;
means for applying the output from each of said delays to one of said plurality of sonic transducer elements;
and means for applying one of said pair of currents to one of said two variable delays and means for applying the other of said pair of currents to the other of said two variable delays to control the radiation pattern from said transducer elements.

7. In a depth sounding system for installation in a ship;
a signal generator;
a fixed delay;
two variable delays;
said variable delays increasing their magnitude of delay with a decrease in current flow through said delay;
means for applying a portion of the output from said signal generator to said fixed delay;
means for applying a portion of the remainder of the output from said signal generator to each of said variable delays;
a ship's roll sensor;
an electronic amplifier comprising a pair of electronic devices, each of said electronic devices having a control element;
means for applying an output signal from said roll sensor to each of said control elements;
said electronic devices each providing a current signal which changes in a reverse sense from each other in accordance with the magnitude of said output signal from said sensor;
a plurality of sonic transducer elements;
means for coupling the output from each of said fixed and variable delays to one of said plurality of sonic transducer elements;
and means for applying a current from one of said electronic devices to one of said variable delays and means for applying the other of said currents to the other of said variable delay to control the radiation pattern from said transducer elements.

8. In a depth sounding system for installation in a ship;
a signal generator;
a fixed delay;
two variable delays;
said variable delays increasing their magnitude of delay with a decrease in current flow through said delay;
means for applying a portion of the output from said signal generator to said fixed delay;
means for applying a portion of the remainder of the output from said signal generator to each of said variable delays;
a ship's roll sensor;
said sensor comprising a sensing element oriented and weighted to true vertical and a resistive element which swings relative to the roll of said ship in contact with said sensing element;
a first electronic device;
a second electronic device;
means for connecting one end of said resistive element to said first electronic device;
means for connecting the other end of said resistive element to said second electronic device;
said first and second electronic devices providing current signals which vary in a reverse sense from each other in accordance with the magnitude of a signal from said resistive element;
a plurality of sonic transducer elements;
means for applying the output from each of said fixed and variable delays to one of said plurality of sonic transducer elements;
and means for coupling said first electronic device to one of said variable delays and means for coupling the second electronic device to the other of said variable delays to continuously sweep the ocean floor at a point closest to said transducer elements.

9. A ship-borne system;
in combination:
a plurality of transducer means;
means for positioning said transducers in a common plane;
a signal generator;
means for applying a signal from said signal generator to each of said plurality of transducer means;
means for variably delaying the signal applied to some of said transducer means;
a ship's roll sensor;
an electronic amplifier;
said amplifier operating on a roll signal from said sensor to provide at least a pair of control signals which change in a reverse sense from each other in accordance with the magnitude of an output signal from said sensor;
and means for providing a steered narrow beam width signal continuously perpendicular to said common transducer plane comprising means for applying at least one of said pair of control signals to vary the delay of each of said means for variably delaying said signal applied to some of said transducers.

10. A combination in accordance with claim 9 wherein said sensor includes a pendulous weighted element oriented perpendicular to said common plane;
and a resistive element which moves in accordance with the roll of said ship and contacts said pendulous element to provide a signal representative of the roll of said ship.

References Cited by the Examiner

UNITED STATES PATENTS

| | | | |
|---|---|---|---|
| 2,407,169 | 9/46 | Loughren | 343—10 |
| 2,419,603 | 4/47 | Smith | 181—0.5 |
| 2,464,276 | 3/49 | Varian | 343—100 |
| 2,544,677 | 3/51 | Hammond | 343—6.5 |
| 2,786,193 | 3/57 | Rich | 340—6 |
| 2,826,749 | 3/58 | Ellenberger | 340—3 |
| 2,972,732 | 2/61 | Hammond | 340—6 |
| 3,037,185 | 5/62 | Dewitz | 340—6 |
| 3,144,631 | 8/64 | Lustig et al. | 340—3 |

FOREIGN PATENTS 1,038,460  9/58  Germany.

OTHER REFERENCES

"Automatic Stabilization of Underwater Acoustic Beams Without Mechanical Motion of the Transducer," by D. G. Tucker et al. The International Hydrographic Review, vol. 37, No. 1, January 1960, pp. 69–78 relied on.

CHESTER L. JUSTUS, *Primary Examiner.*